Aug. 21, 1934.  L. C. HINCKLEY  1,970,962
SUPPORTING BRACKET
Filed Aug. 15, 1932

INVENTOR,
Louis C. Hinckley,
BY
Harry W. Bowen
ATTORNEY.

Patented Aug. 21, 1934

1,970,962

UNITED STATES PATENT OFFICE 1,970,962

SUPPORTING BRACKET

Louis C. Hinckley, Springfield, Mass.

Application August 15, 1932, Serial No. 628,816

6 Claims. (Cl. 224—29)

My invention relates to improvements in supporting brackets, and more particularly to that type of supporting bracket that is designed, or intended, as a support for a fishing rod, or similar article.

An object of my invention is to provide supporting brackets which may be removably secured to and located on the outer surface of the body of a motor vehicle, and which will securely support and grip a fishing rod, without in any way marring the rod or the motor vehicle body.

A further object of my invention is to provide means for removably securing and supporting a plurality of fishing rods on the outside of a motor vehicle in their assembled, or extended, condition, ready to use, thereby eliminating the necessity of breaking down the rods when moving from one fishing location to another, and re-assembling them again after arriving at the desired destination.

These and other objects and advantages of my invention will be more completely described and illustrated, with reference to the accompanying drawing, the specification, and the appended claims.

Broadly, my invention comprises a hanger, or attaching member, an arm secured to the hanger member, clamping means on said arm for gripping and holding a fishing rod, or rods, and means on said arm for removably securing a fishing hook, or fly, to said arm.

I have chosen to show and describe my device, as it is used in co-operation with a motor vehicle, but I do not confine myself solely to this particular use, as the same device may be used with equal advantage in other environments, such as the wall of a cottage, the gunwale of a boat, the cabin of a yacht, etc.

A preferred embodiment of my invention is illustrated in the accompanying drawing, in which.

Referring now to the drawing in detail, in which like numerals refer to like parts throughout.

Figure 1:
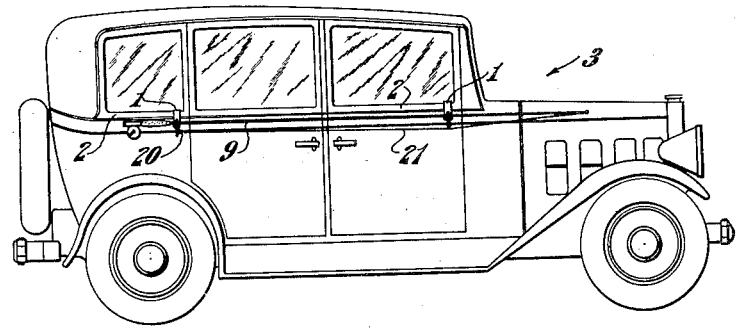
Fig. 1 is a side elevational view of a motor vehicle showing a pair of the rod-supporting brackets secured thereto, and a rod secured in the brackets.
Figure 2:
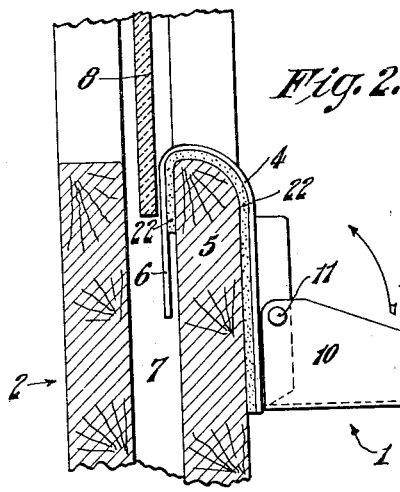
Fig. 2 is a side elevational view, partially in section, on an enlarged scale, illustrating a bracket secured to the door of a motor vehicle.
Figure 3:
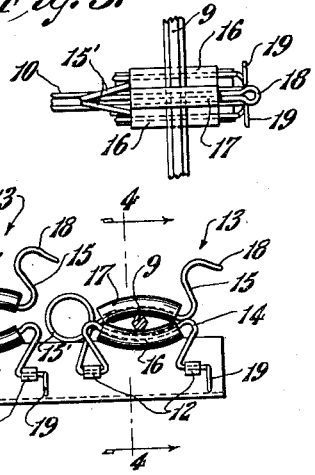
Fig. 3 is a partial plan view showing one of the rod-clamping members secured to the bracket arm.
Figure 4:
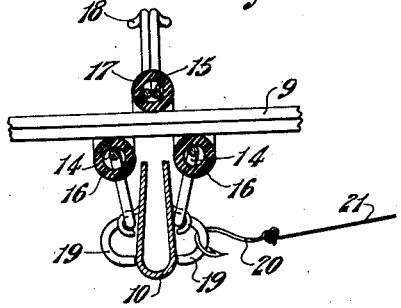
Fig. 4 is a sectional view on the line 4—4 of Fig. 2.

The brackets 1 are removably attached, or secured, to the window sills 2 of the motor vehicle 3 by means of the hanger member 4, which is hooked over the outer sill 5, (see Fig. 2), with the bent portion 6 extending downwardly into the glass pocket 7 between the glass 8 and the outer sill 5. The two fishing rods 9 and 9' are securely held against displacement and supported by the bracket 1 and in their assembled condition, with the reel, lines, etc., attached, during movement of the motor vehicle from one location to another.

An arm member 10 is pivotally secured to the hanger member 4, as indicated at 11, and is formed with the struck-up clips 12, in which are secured the clamping members 13. The clamping members 13 include the saddle members 14 and upper spring clamping member 15; the coil of the spring is indicated at 15'. Resilient coverings 16 and 17, of corrugated rubber tubing, or similar material, are placed on the saddle members 14 and clamping members 15, serving to firmly grip the two fishing rods 9 and 9' securely and without marring, or scratching, them in any way. The hook portion 18, formed on the member 15, provides a convenient means for lifting the upper rod clamping member 15, as illustrated in dotted lines in Fig. 2, for the purpose of inserting a rod between the saddle members 14 and upper spring clamp member 15, or, removing a rod therefrom. The outer ends of the lower saddle members 14, beyond the struck-up clips 12, are formed into the loops 19, which provide an anchorage for the fishing hook 20, secured on the line 21. The hanger members 4 have secured thereto pads 22 of felt, or any similar soft material, which effectually prevents any contact of the metal parts of the bracket 1 with the finish of the sill 2, thereby protecting the car finish from scratches, etc., when the brackets 1 are secured thereto.

Figure 5:
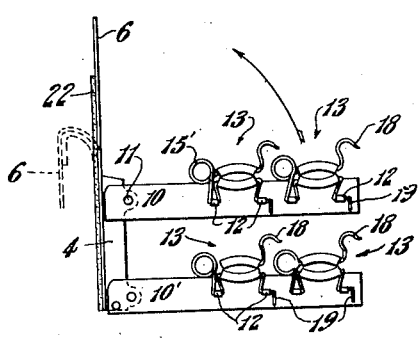
Fig. 5 is a side elevational view of a modified form of bracket having two supporting arms.

A modified form of bracket is illustrated in Fig. 5. This is the same as that illustrated in the other views, in all respects, except that two arms 10 and 10' are employed. When it is desired to place rods on the lower arm 10', or remove them therefrom, the upper arm 10 is raised, or folded upward, out of the way.

The hanger member 4 is made from sheet metal, and ordinarily is left straight, as illustrated in Fig. 5. It may thus be formed, or bent, to fit any contour of sill by inserting the end portion 6 between the glass 8 and sill 5, and then bending over the sill 5.

It will be seen from this description that I have provided a very convenient means for removably supporting one or more assembled fishing rods, with reel, line and hook attached on the outer side of a motor vehicle, whereby it may be readily inserted and removed, ready for use, without the necessity of losing any time in going from one place to another.

What I claim is:

1. As an article of manufacture for gripping a fish rod comprising, a bracket member formed with a hanger portion shaped to conform to the cross sectional contour of the outer sill of a motor vehicle and having a single arm portion extending outwardly from the hanger portion, a lining of resilient material on the inner surface of said hanger portion, resilient clamping means secured on said single arm portion comprising lower saddle members pivotally secured on the opposite sides of said arm portion and an integral upper spring clamping member secured on said arm portion above and between the oppositely located saddle members and cooperating with said saddle members, a covering of resilient material on each of said clamping members, and means on said arm portion for removably securing a fish hook thereon, when the fish rod is extended and the line drawn from the reel.

2. As an article of manufacture, a bracket member, means on said bracket member for removably securing a fishing rod or the like thereon, said means comprising an integral spring clamp having lower saddle portions located on each side of the bracket member, a resilient sleeve on the saddle portions, a spring loop at one end of said saddle members, a clamp member above said saddle members and located between said saddle members, a finger grip formed on said clamp member for the purpose of raising the clamp member for inserting or removing a fishing rod, and a loop formed on the opposite end of said saddle members for the purpose of engaging a fish hook therein, substantially as described.

3. A bracket device for the purpose described, comprising a bendable hanger member, an arm secured to the hanger member, two oppositely located bow-shaped resilient clamping members on the arm, a third clamping member above the other two and being spring-actuated and movable upward for permitting the insertion of an article to be clamped, and said members having a covering of tubular resilient material.

4. As an article of manufacture, a supporting bracket for a fish rod comprising a rigid hanger member, an arm secured to said member, a resilient saddle member secured on said arm, and a spring clamping member formed as an integral part of the resilient saddle member which is secured on said arm and co-operating with said saddle member for gripping a fish rod, substantially as described.

5. A device for clamping a rod-like member comprising a support, a curved member located on the opposite sides of the support and having a pivotal connection with the support, an inverted curved member located above and between the two first mentioned curved members and being integrally connected with a spring coil to the said oppositely located curved members, elastic coverings on the said members, whereby bottom spaced supports are provided for a rod-like member and a top support above and between the spaced supports and both vertical and longitudinal movement of a rod is prevented due to the elastic coverings and the spring clamping effect.

6. A supporting bracket for holding or transporting fully extended fishing rods complete with lines, reels and hooks in a horizontal position comprising in combination, a hanger or back portion lined with felt or soft material and bendable so it may be bent easily to conform to any contour, an arm portion secured to and projecting outwardly and horizontally therefrom, and resilient means on said arm providing a three point support for removably securing fishing rods thereto in such a manner as to cause no strain or damage to said rods, said three point support comprising two separated resilient members below the rods and a single resilient member above the rod and between the first two members.

LOUIS C. HINCKLEY.